July 23, 1929.                F. HIMMEL ET AL                1,721,596
                        STORE FRONT CONSTRUCTION
                          Filed June 20, 1928
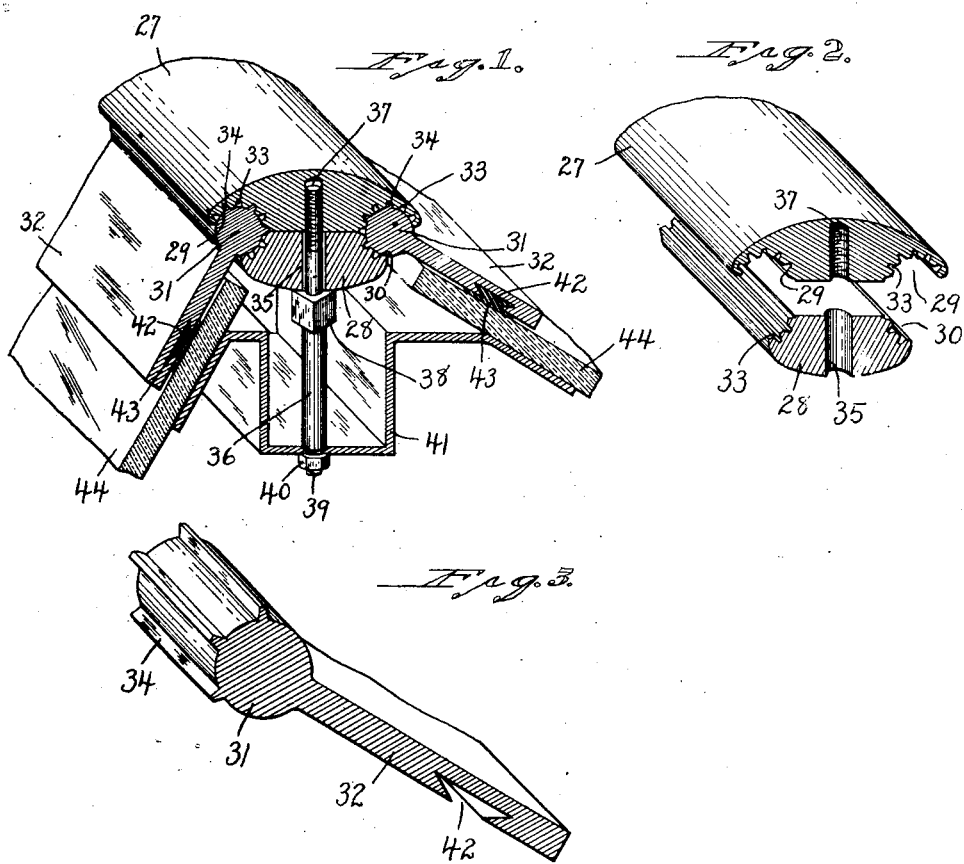

Patented July 23, 1929.

1,721,596

UNITED STATES PATENT OFFICE.

FRED HIMMEL AND ISIDORE HIMMEL, OF NEW HAVEN, CONNECTICUT, ASSIGNORS TO THE HIMMEL BROTHERS CO., OF NEW HAVEN, CONNECTICUT, A CORPORATION.

STORE-FRONT CONSTRUCTION.

Application filed June 20, 1928. Serial No. 286,846.

This invention relates to improvement in store-front construction and particularly to corner construction where two pieces of glass are connected together sometimes in the same plane and sometimes at an angle to each other.

The objection of this invention is to provide an attractive corner which is readily adapted to be conformed to the positions of the glass to be supported, and the invention consists in the construction as hereinafter described and particularly recited in the claim.

In the accompanying drawings:

Fig. 1 is a broken perspective view of a corner for store-front construction also embodying our invention;

Fig. 2 is a broken perspective view of the two clamping-strips in a separated position; and Fig. 3 is a broken perspective view of one of the outer clamping-strips for corner construction.

As shown in Figs. 1, 2 and 3 of the drawings, we employ two extruded strips 27 and 28 formed near their edges with complementary segmental channels 29 and 30, between which heads 31 of extruded clamping-strips 32 may be clamped, and preferably the channels will be formed with parallel grooves 33 to receive parallel ribs 34 formed on the clamping-strips 32. The inner strip 28 will be formed with holes 35 for the passage through it of fastening-screws 36 which are threaded into openings 37 in the outer strips, these screws being preferably provided with angular collars 38 to bear upon the inner strip so as to clamp it against the outer strip and clamp the outer retaining-strips 32 in position and at the desired angles. The outer end of the screw 39 will be threaded to receive a nut 40, whereby an inner clamping strip 41 may be held in position. The clamping-members 32 will be provided with undercut grooves 42 to receive cushion-strips 43 to bear against the sheet of glass 44 in the same manner as before described.

With this construction the edges of two sheets of glass may be supported, the device being capable of accommodation to various angles. The undercut grooves 42 and cushion-strips 43 shown in the drawings are not claimed herein but form the subject matter of a separate application.

We claim:

A corner for store-front construction consisting of two members adapted to be clamped together and formed with segmental channels and longitudinal grooves in said channels, outer clamping members formed with heads entering said channels and provided with longitudinal ribs adapted to enter the said grooves, and means for interlocking said heads with said members.

In testimony whereof, we have signed this specification.

FRED HIMMEL.
ISIDORE HIMMEL.